1002580B2

United States Patent
Zhu et al.

(10) Patent No.: US 11,002,580 B2
(45) Date of Patent: May 11, 2021

(54) METHOD FOR ASCERTAINING A PHYSICAL PARAMETER OF A GAS-CONTAINING LIQUID

(71) Applicant: Endress + Hauser Flowtec AG, Reinach (CH)

(72) Inventors: Hao Zhu, Freising (DE); Alfred Rieder, Landshut (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 512 days.

(21) Appl. No.: 16/063,780

(22) PCT Filed: Nov. 17, 2016

(86) PCT No.: PCT/EP2016/077942
§ 371 (c)(1),
(2) Date: Jun. 19, 2018

(87) PCT Pub. No.: WO2017/108283
PCT Pub. Date: Jun. 29, 2017

(65) Prior Publication Data
US 2020/0271494 A1    Aug. 27, 2020

(30) Foreign Application Priority Data
Dec. 23, 2015  (DE) ............ 10 2015 122 661.8

(51) Int. Cl.
*G01F 1/00*   (2006.01)
*G01F 1/66*   (2006.01)

(52) U.S. Cl.
CPC .................. *G01F 1/668* (2013.01)

(58) Field of Classification Search
CPC .................. G01F 1/668; G01F 1/00
See application file for complete search history.

(56) References Cited

U.S. PATENT DOCUMENTS

| 4,262,523 A | 4/1981 | Stansfeld |
| 2011/0023626 A1 | 2/2011 | Weinstein |
| 2011/0264385 A1 | 10/2011 | Weinstein et al. |

FOREIGN PATENT DOCUMENTS

| CN | 10-2216739 A | 10/2011 |
| DE | 196 52 002 A1 | 6/1997 |

(Continued)

OTHER PUBLICATIONS

German Search Report, German PTO, Munich, dated Aug. 5, 2016.
(Continued)

*Primary Examiner* — Jamel E Williams
(74) *Attorney, Agent, or Firm* — Bacon & Thomas, PLLC

(57) ABSTRACT

A method for ascertaining a physical parameter of a liquid containing gas in the form of suspended bubbles by means of a measuring transducer with an excitable measuring tube serving for guiding the liquid in bending oscillation modes of various eigenfrequencies, includes steps as follows: ascertaining the eigenfrequencies of the f1-mode and the f3-mode; ascertaining preliminary density values for the gas-containing liquid guided in the measuring tube based on the eigenfrequencies of the f1-mode and the f3-mode; ascertaining a value for the velocity of sound of the gas-containing liquid guided in the measuring tube, and/or ascertaining, as a function of the velocity of sound and the eigenfrequency of a mode, at least one correction term and/or density error for the preliminary density value, which was ascertained based on the eigenfrequency of the mode, for determining a corrected density measured value; and/or a correction term for a preliminary mass flow value for determining a corrected mass flow measured value based on the first preliminary density value, the second preliminary density value, the eigenfrequency of the f1-mode and the eigenfrequency of the f3-mode.

14 Claims, 4 Drawing Sheets

(56) References Cited

FOREIGN PATENT DOCUMENTS

Figure 1:
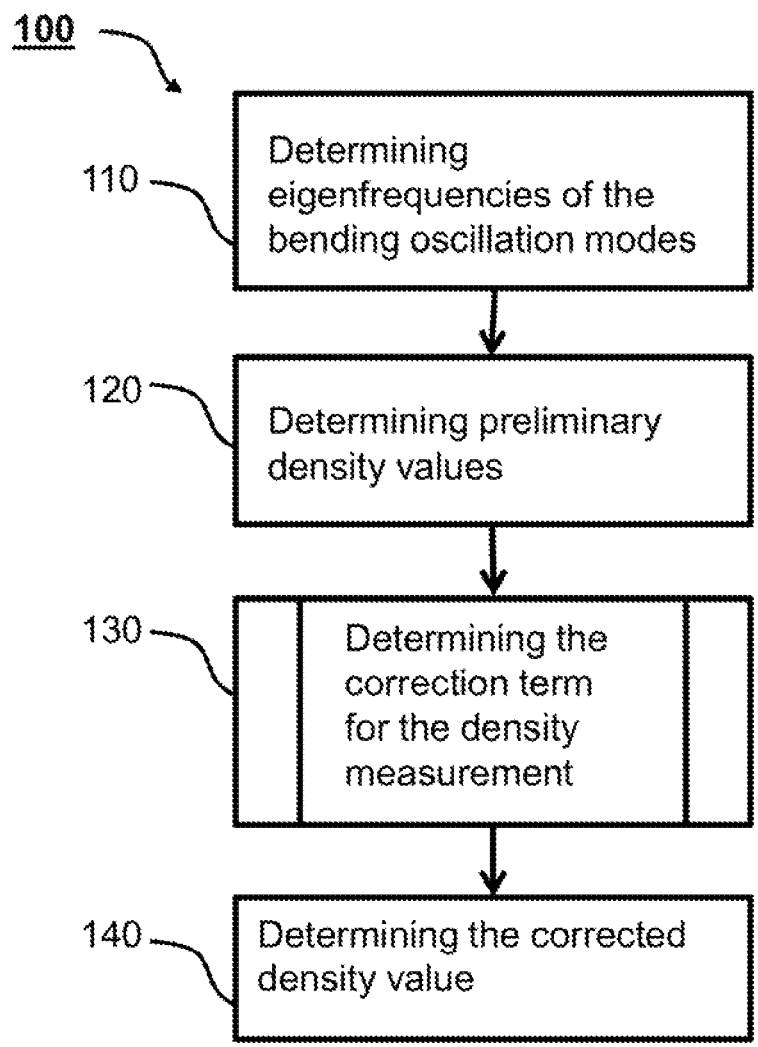

| | | |
|---|---|---|
| DE | 10 2015 122 661 A1 | 6/2017 |
| EP | 1 190 221 B1 | 3/2002 |
| EP | 2 026 042 A1 | 2/2009 |
| WO | 01/01086 A1 | 1/2001 |
| WO | 2017/108283 A1 | 6/2017 |

OTHER PUBLICATIONS

International Search Report, EPO, The Netherlands, dated Feb. 17, 2017.
Office Action dated Sep. 24, 2019 in corresponding Chinese application No. 201680074668.8.

METHOD FOR ASCERTAINING A PHYSICAL PARAMETER OF A GAS-CONTAINING LIQUID

TECHNICAL FIELD

Please replace the second paragraph which appears on page 1, line 18 and ends on line 27, with the following rewritten paragraph:

BACKGROUND DISCUSSION

Published International Application, WO 01/01086 A1 discloses a method for compressibility compensation in the case of mass flow measurement in a Coriolis mass flow meter. In such case, mass flow measurement is performed in two different modes, of which one is a bending oscillation mode and another a radial oscillation mode. A comparison of the mass flow values ascertained by means of these two modes is used. This is, however, a problematic approach, since the radial mode oscillations have considerable dependence on the flow profile and on the static pressure. Additionally, more sensors than the usual two are required, in order to be able to register both bending oscillations as well as also radial mode oscillations. Equally, a more complex exciter structure is required.

SUMMARY OF THE INVENTION

The present invention relates to a method for ascertaining a physical parameter of a gas-containing liquid by means of a measuring transducer having at least one measuring tube for guiding the gas-containing liquid, wherein the measuring tube has an inlet side end section and an outlet side end section, wherein the measuring transducer has at least one inlet side affixing apparatus and one outlet side affixing apparatus, with which the measuring tube is affixed, in each case, into a different one of the end sections, wherein the measuring tube is excitable between the two affixing apparatuses to execute oscillations, wherein mass flow and density of the gas-containing liquid are determinable from the oscillatory behavior of the measuring tube. The measured values for mass flow and density have, however, cross sensitivities to the velocity of sound and compressibility of the gas-containing liquid, which increase with increasing gas load. A compensation of these cross sensitivities is, consequently, desired.

WO 01/01086 A1 discloses a method for compressibility compensation in the case of mass flow measurement in a Coriolis mass flow meter. In such case, mass flow measurement is performed in two different modes, of which one is a bending oscillation mode and another a radial oscillation mode. A comparison of the mass flow values ascertained by means of these two modes is used. This is, however, a problematic approach, since the radial mode oscillations have considerable dependence on the flow profile and on the static pressure. Additionally, more sensors than the usual two are required, in order to be able to register both bending oscillations as well as also radial mode oscillations. Equally, a more complex exciter structure is required.

It is, consequently, an object of the present invention to provide a measuring method with a more robust and at the same time simpler compensation of cross sensitivities for compressibility and velocity of sound. The object of the invention is achieved by the method of the independent claim.

The method of the invention is a method for ascertaining a physical parameter of a gas-containing liquid by means of a measuring transducer having at least one measuring tube for guiding the gas-containing liquid, wherein the gas is present especially in the form of bubbles suspended in the liquid, wherein the measuring tube has an inlet side end section and an outlet side end section. The measuring transducer has at least one inlet side affixing apparatus and one outlet side affixing apparatus, with which the measuring tube is, in each case, affixed into a different one of the end sections. The measuring tube is excitable between the two affixing apparatuses to execute bending oscillations of various modes with different eigenfrequencies, of which an f1-mode has no oscillation nodes between the affixing apparatuses, and an f3-mode has two oscillation nodes between the affixing apparatuses. The method comprises steps as follows: ascertaining the eigenfrequencies of the f1-mode and the f3-mode; ascertaining a first preliminary density value for the gas-containing liquid guided in the measuring tube based on the eigenfrequency of the f1-mode; ascertaining a second preliminary density value for the gas-containing liquid guided in the measuring tube based on the eigenfrequency of the f3-mode; ascertaining a value for the velocity of sound of the gas-containing liquid guided in the measuring tube, and/or ascertaining, as a function of the velocity of sound and the eigenfrequency of a mode, at least one correction term and/or density error for the preliminary density value, which was ascertained based on the eigenfrequency of the mode, for determining a corrected density measured value; and/or ascertaining a correction term for a preliminary mass flow value for determining a corrected mass flow measured value based on the first preliminary density value, the second preliminary density value, the eigenfrequency of the f1-mode and the eigenfrequency of the f3-mode.

Suspended bubbles are especially bubbles, whose size is no greater than three times a penetration depth, which depends on the kinematic viscosity of the liquid and the eigenfrequency of the f1-mode.

To a first approximation, the formula for a preliminary density value $\rho_i$ of a gas-containing liquid as a function of eigenfrequency $f_i$ of an fi-mode can be of the following form:

$$\rho_i = c_{0i} + c_{1i}\frac{1}{f_i^2} + c_{2i}\frac{1}{f_i^4},$$

wherein $c_{0i}$, $c_{1i}$, and $c_{2i}$, are mode dependent coefficients.

The above approximation does not, however, take into consideration the influences of the oscillating gas-containing liquid in the measuring tube. The closer the resonant frequency of the oscillating gas-containing liquid is to the eigenfrequency of a bending oscillation mode, the greater is the influence of the eigenfrequency. Since the resonant frequency of the gas-containing liquid lies, usually, above the eigenfrequency of the measuring tubes, the influence on the f3-bending oscillation mode is greater than influence on the f1-bending oscillation mode. This leads to different preliminary mode specific density values, wherein the ratio between the preliminary density values provides the opportunity to ascertain and to correct the influence of the oscillating gas-containing liquid.

The resonant frequency of the oscillating gas-containing liquid depends on its velocity of sound. In a further development of the invention, a mode specific correction term $K_i$ for a preliminary density value is, consequently, a function of a quotient of the velocity of sound of the gas-containing liquid and the eigenfrequency of the mode, with which the preliminary density measured value was ascertained.

In a further development of the invention, the velocity of sound c of the gas-containing liquid is determined by searching for that sound velocity value, in the case of which the quotient of the first correction term for the first preliminary density value divided by the second correction term for the second preliminary density value equals the quotient of the first preliminary density value divided by the second preliminary density value. Which mathematical procedure is used, in such case, is of lesser importance.

In a further development of the invention, the correction term $K_i$ for the preliminary density values $\rho_i$ as a function of the eigenfrequency of the $f_i$-mode has the following form:

$$K_i \approx \left(1 + \frac{r}{\left(\frac{g \cdot c}{f_i}\right)^2 - b}\right), \text{ wherein}$$

$$\rho_{corr} = \frac{\rho_i}{K_i}$$

wherein r and g are gas independent constants, c is the velocity of sound of the gas-containing liquid, $f_i$ is the eigenfrequency of the $f_i$-mode, $\rho_{corr}$ the corrected density, and b a scaling constant, wherein especially: $r/b<1$, especially $r/b<0.9$, and/or $b=1$.

In a further development of the invention, g in the above equation is a proportionality factor between a resonant frequency $f_{res}$ of the gas-containing liquid and the velocity of sound of the gas-containing liquid and depends on the diameter of the measuring tube, wherein:

$$f_{res} = g \cdot c$$

In a further development of the invention, the preliminary density values are determined based on the eigenfrequency of the $f_i$-mode by means of a polynomial in $1/f_i$, especially in $(1/f_i)^2$, wherein the coefficients of the polynomial are mode dependent.

In a further development of the invention, there holds for a density error $E_{\rho i}$ of a preliminary density value based on the eigenfrequency of the fi-mode:

$$E_{\rho i} := K_i - 1,$$

wherein a mass flow error $E_m$ of a preliminary mass flow value is proportional to the density error $E_{\rho i}$ of the first preliminary density value as follows:

$$E_m := k \cdot E_{\rho 1},$$

wherein the proportionality factor k is not less than 1.5, for example, not less than 1.8 and especially not less than 1.9, wherein the proportionality factor k is no greater than 3, for example, no greater than 2.25 and especially no greater than 2.1. In a currently preferred embodiment of the invention, the proportionality factor $k=2$.

A correction term $K_m$ for the mass flow is:

$$K_m := 1 + E_m,$$

wherein the corrected mass flow $\dot{m}_{corr}$ is ascertained as $$\dot{m}_{corr} = \frac{\dot{m}_v}{K_m},$$

and wherein $\dot{m}_v$ is the preliminary mass flow value.

In a further development of the invention, the method additionally includes steps as follows:

determining a deviation between the first preliminary density value based on the eigenfrequency of the f1-mode and the second preliminary density value based on the eigenfrequency of the f3-mode; testing whether the deviation is greater than a reference value; and, when this is the case, ascertaining, and, in given cases, outputting, a value for the velocity of sound.

In a further development of the invention, the reference value for the deviation of the density values is so selected that the velocity of sound can be determined with a statistical error of no greater than 10%, especially no greater than 5% and preferably no greater than 2%.

In a further development of the invention, the reference value is not less than 0.2 kg/m$^3$ especially not less than 0.4 kg/m$^3$, wherein the reference value is also no greater than 2 kg/m$^3$, for example, no greater than 1 kg/m$^3$, and especially no greater than 0.6 kg/m$^3$.

In a further development of the invention, the method is especially applied when the gas-containing liquid oscillating in the measuring tube has a resonant frequency, which is no greater than 20 times the eigenfrequency of the f1-mode of the measuring tube.

In a further development of the invention, the method is applied when the suspended bubbles have a radius r, which is no greater than five times, especially no greater than three times, a penetration depth $\delta$, wherein $$\delta = (\nu/(\pi * f_1))^{1/2}$$

wherein $\nu$ is the kinematic viscosity of the liquid and f1 the eigenfrequency of the f1-mode.

The penetration depth $\delta$ describes the range of a flow field due to relative movements of a bubble suspended by its surrounding liquid. In the case of small radii, suspended bubbles essentially affect the compressibility, while in the case of radii, which significantly exceed the penetration depth, additional effects occur, which degrade the accuracy of the corrections of the invention.

Figure 2:
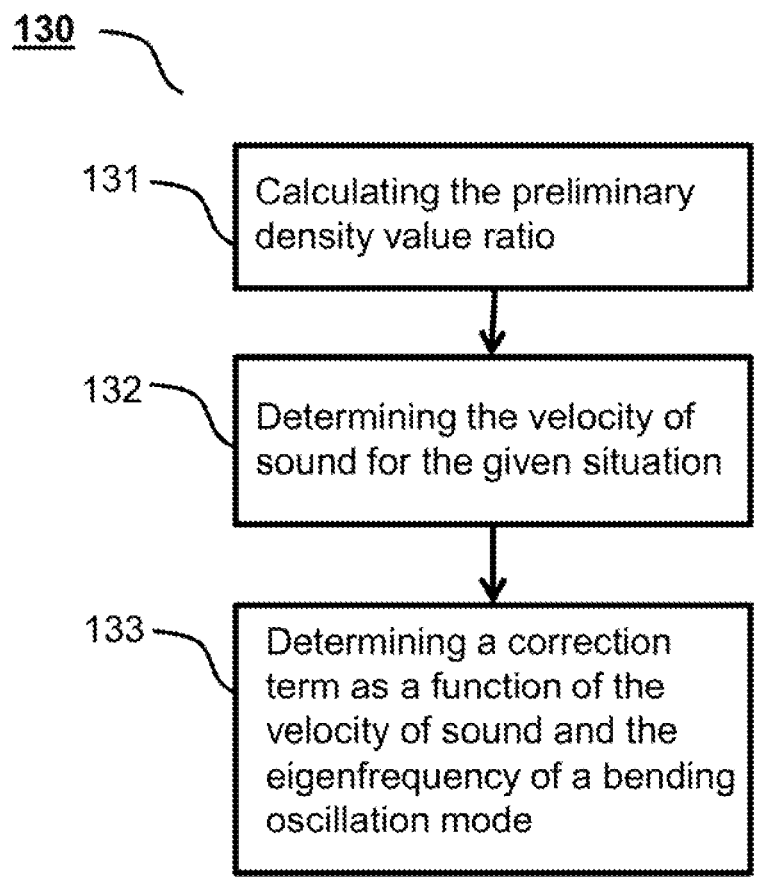
Figure 3:
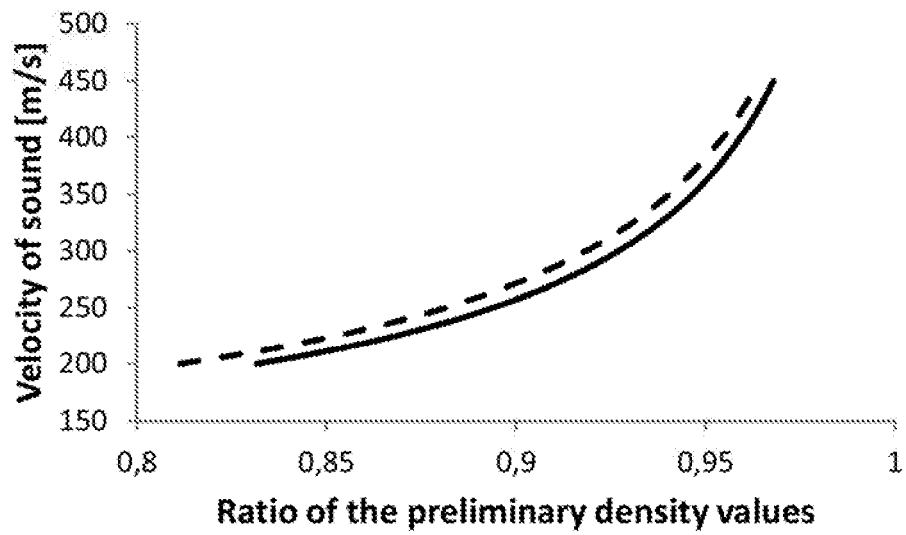
Figure 4:
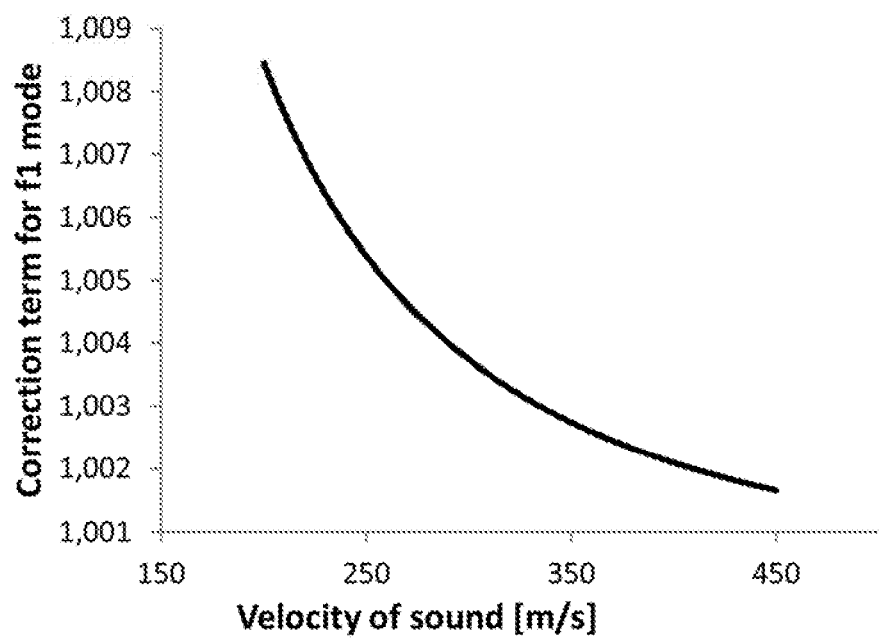
Figure 5A:
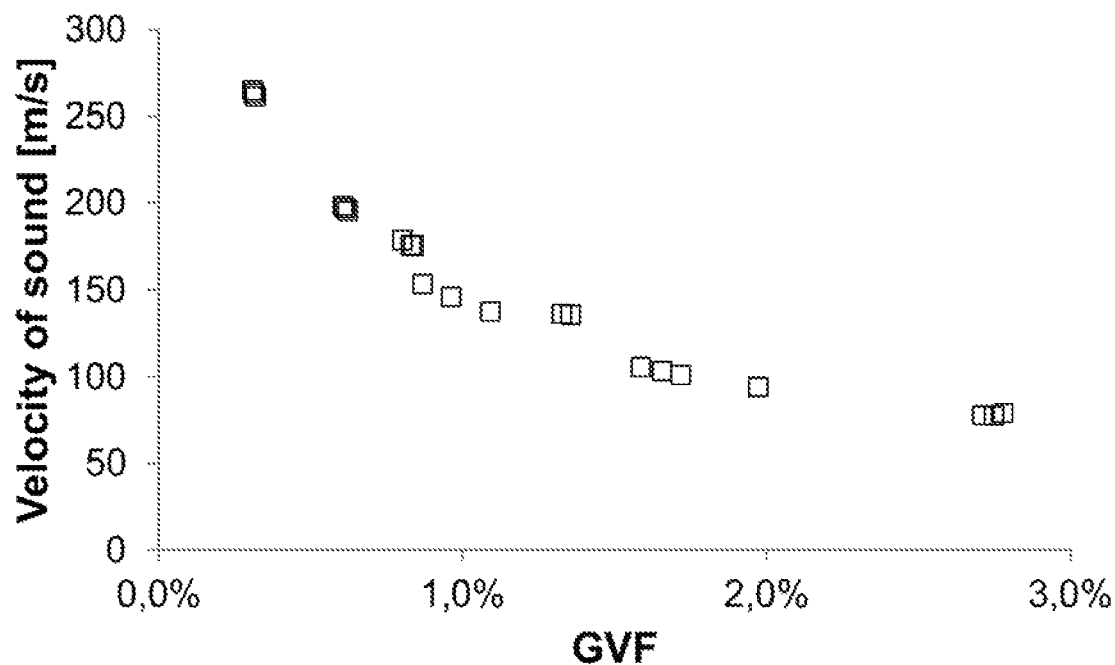
Figure 5B:
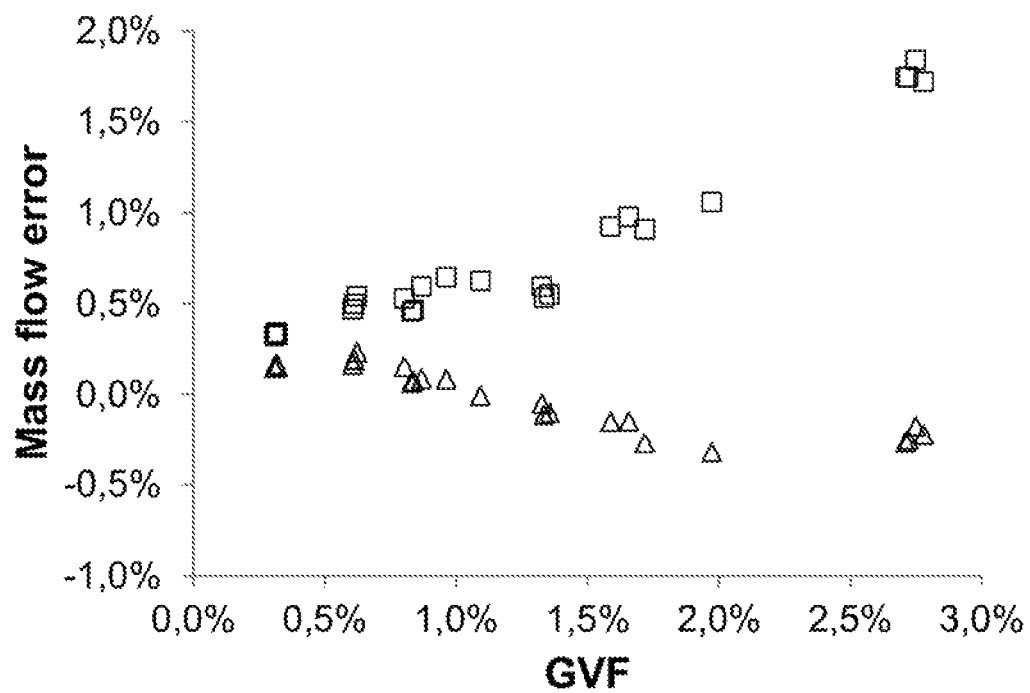

The invention will now be explained in greater detail based on the example of an embodiment presented in the drawing, the figures of which show as follows:

FIG. 1 a flow diagram for a first example of an embodiment of a method of the invention;

FIG. 2 a flow diagram for a detail of the first example of an embodiment of the method of the invention;

FIG. 3 a graph showing the relationship between the ratio of the density measured values and the velocity of sound;

FIG. 4 a graph showing the relationship between a density correction value and the velocity of sound;

FIG. 5a a graph showing sound velocity values ascertained with the method of the invention; and FIG. 5b a graph showing density values ascertained with the method of the invention.

The example of an embodiment of a method 100 of the invention shown in FIG. 1 for determining a density value begins in a step 110 for determining the eigenfrequencies of the f1-bending oscillation mode and the f3-bending oscillation mode. For this, the f1-bending oscillation mode and the f3-bending oscillation mode can especially be excited simultaneously. The sought eigenfrequencies can be ascertained by maximizing the ratio of the oscillation amplitude to the mode specific excitation power by varying the excitation frequencies.

Based on the ascertained eigenfrequencies fi, in a step 120, preliminary density values $\rho_1$ and $\rho_3$ are determined using the formula:

$$\rho_i = c_{0i} + c_{1i}\frac{1}{f_i^2} + c_{2i}\frac{1}{f_i^4},$$

wherein $c_{0i}$, $c_{1i}$, and $c_{2i}$, are mode dependent coefficients.

In a step 130, which is explained in greater detail below based on FIGS. 2 to 4, the determining of a correction term for density measurement occurs.

Finally in a step 140, a corrected density value is determined by means of the correction term.

As shown in FIG. 2, step 130 includes for determining the correction term, firstly, in a step 131, the calculating of the ratio V of the preliminary density values, thus, for example, the division of the preliminary density values $\rho_1$ and $\rho_3$ to yield V:=$\rho_1|\rho_3$.

Then, in a step 132, the velocity of sound c is determined, which leads in the case of measured eigenfrequencies of the bending oscillation modes to the calculated ratio V of the preliminary density values:

$$\frac{\left(1+\dfrac{r}{\left(\frac{g \cdot c}{f_1}\right)^2 - b}\right)}{\left(1+\dfrac{r}{\left(\frac{g \cdot c}{f_3}\right)^2 - b}\right)} = V$$

wherein r is, for instance, 0.84, b=1 and g is a measuring tube dependent proportionality factor between velocity of sound and resonant frequency, which can assume, for example, a value of 10/m.

FIG. 3 shows the velocity of sound as a function of the ratio V of the preliminary density values for two different value pairs of eigenfrequencies of the bending oscillation modes. The solid line is for f1=200 Hz and f3=900 Hz and the dashed line for f1=210 Hz and f3=950 Hz. Thus, for example, in the case of f1=200 Hz and f3=900 Hz, a velocity of sound of, for instance, c=360 m/s is present at V=0.95 f1=200 Hz and f3=900 Hz.

Based on the ascertained velocity of sound, then in step 133 of the method in FIG. 2, a mode specific correction term $K_i$ is calculated using:

$$K_i \approx \left(1 + \frac{r}{\left(\frac{g \cdot c}{f_i}\right)^2 - b}\right).$$

The preliminary density value $\rho_i$ is, finally, used in step 140 of the method in FIG. 1 to calculate the corrected density value:

$$\rho_{corr} \cdot = \frac{\rho_i}{K_i}$$

The preliminary density value $\rho_i$ is thus divided by the correction term $K_i$, in order to obtain the corrected density value $\rho_{corr}$.

FIG. 4 shows the correction term K ascertained in step 133 for the f1 mode in the case of an eigenfrequency of f1=200 Hz. According to the velocity of sound of c=360 m/s ascertained in step 132, the preliminary density value based on the eigenfrequency of the f1-bending oscillation mode would be, for instance, 0.26% too large. The preliminary density value is thus to be divided by the correction term 1.0026, in order to obtain the corrected density value.

Shown in FIG. 5a are results for the determining of the invention of the velocity of sound in salt water as a function of the gas bubble fraction (GVF or Gas Void Fraction). During the experiment, the eigenfrequency of the f1-mode decreased, in such case, with increasing gas bubble fraction, for instance, from 177.3 Hz to, for instance, 174.5 Hz, while the eigenfrequency of the f3-mode fell, for instance, from 1088.8 Hz to, for instance, 1015 Hz.

Shown in FIG. 5b are, finally, results for the determining of the invention of the mass flow by means of the method of the invention in the case of different values for the gas bubble fraction, wherein the respective correction terms for correction of the preliminary mass flow values were ascertained based on the sound velocity values illustrated in FIG. 5a. The squares are for the error for the uncorrected values, while the triangles represent the error for the corrected values of the invention.

The correction terms for a preliminary mass flow measured value of a Coriolis mass flow measurement device can be determined from the correction terms for density by first determining the density error $E_{\rho i}$, from the correction terms $K_i$ for density:

$$E_{\rho i} := K_i - 1,$$

The mass flow error $E_m$ for correction of a preliminary mass flow value is especially twice the first preliminary density error $E_{\rho 1}$, thus:

$$E_m := 2 \cdot E_{\rho 1}.$$

Equally, the mass flow error $E_m$ can be calculated as:

$$E_m \approx 2\left(\frac{r}{\left(\frac{g \cdot c}{f_i}\right)^2 - 1}\right).$$

For a correction term $K_m$ for the mass flow, the following holds:

$$K_m := 1 + E_m,$$

wherein the corrected mass flow $\dot{m}_{corr}$ is ascertained as $$\dot{m}_{corr} \cdot = \frac{\dot{m}_v}{K_m},$$

and wherein $\dot{m}_v$ is a previous mass flow value, which results from the phase difference between the signals of two oscillation sensors arranged symmetrically on the measuring tube and a calibration factor.

The invention claimed is:

1. A method for ascertaining a physical parameter of a gas-containing liquid by means of a measuring transducer having at least one measuring tube for guiding the liquid, wherein the gas is present especially in the form of bubbles suspended in the liquid, said at least one measuring tube has an inlet side end section and an outlet side end section, said measuring transducer has at least one inlet side affixing apparatus and one outlet side affixing apparatus, with which the measuring tube is, in each case, affixed into a different one of the end sections, wherein the measuring tube is excitable between the two affixing apparatuses to execute bending oscillations of various modes with different eigenfrequencies, of which an f1-mode has no oscillation nodes between the affixing apparatuses, and wherein an f3-mode has two oscillation nodes between the affixing apparatuses, the method comprises the steps as follows:

ascertaining the eigenfrequencies of the f1-mode and the f3-mode;

ascertaining a first preliminary density value for the gas-containing liquid guided in the measuring tube based on the eigenfrequency of the f1-mode;

ascertaining a second preliminary density value for the gas-containing liquid guided in the measuring tube based on the eigenfrequency of the f3-mode;

ascertaining a value for the velocity of sound of the liquid in the measuring tube, and/or ascertaining, as a function of the velocity of sound and the eigenfrequency of a mode, at least one correction term and/or density error for the preliminary density value, which was ascertained based on the eigenfrequency of the mode, for determining a corrected density measured value; and/or ascertaining a correction term for a preliminary mass flow value for determining a corrected mass flow measured value based on the first preliminary density value, the second preliminary density value, the eigenfrequency of the f1-mode and the eigenfrequency of the f3-mode.

2. The method as claimed in claim 1, wherein:
a correction term $K_i$ for a preliminary density value is a function of a quotient of the velocity of sound of the gas-containing liquid and the eigenfrequency of the mode, with which the preliminary density measured value was ascertained.

3. The method as claimed in claim 1, wherein:
the velocity of sound c of the gas-containing liquid is determined by searching for that sound velocity value, in the case of which the quotient of the first correction term for the first preliminary density value divided by the second correction term for the second preliminary density value equals the quotient of the first preliminary density value divided by the second preliminary density value.

4. The method as claimed in claim 1, wherein:
a correction term $K_i$ for the preliminary density values $\rho_i$ as a function of the eigenfrequency of the $f_i$-mode has the following form:

$$K_i \approx \left(1 + \frac{r}{\left(\frac{g \cdot c}{f_i}\right)^2 - b}\right), \text{ wherein}$$

$$\rho_{corr} := \frac{\rho_i}{K_i}$$

wherein r and g are gas independent constants, c is the velocity of sound of the gas-containing liquid, $f_i$ is the eigenfrequency of the $f_i$-mode, $\rho_{corr}$ is the corrected density, and b is a scaling constant.

5. The method as claimed in claim 4, wherein:
$r/b < 1$, especially $r/b < 0.9$.

6. The method as claimed in claim 4, wherein $b=1$.

7. The method as claimed in claim 4, wherein:
g is a proportionality factor between a resonant frequency $f_{res}$ of the gas-containing liquid and the velocity of sound of the gas-containing liquid and depends on the diameter of the measuring tube; and $f_{res} = g \cdot c$.

8. The method as claimed in claim 1, wherein:
the preliminary density values are determined based on the eigenfrequency of the $f_i$-mode by means of a polynomial in $1/f_i$, especially in $(1/f_i)^2$, wherein the coefficients of the polynomial are mode dependent.

9. The method as claimed in claim 4, wherein:
for a density error $E_{\rho i}$ of a preliminary density value based on the eigenfrequency of the fi-mode, the following holds:

$E_{\rho i} := K_i - 1$, wherein a mass flow error $E_m$ of a preliminary mass flow value is proportional to the density error $E_{\rho 1}$ of the first preliminary density value as follows:

$E_m := k \cdot E_{\rho 1}$, wherein the proportionality factor k is not less than 1.5, for example, not less than 1.8 and especially not less than 1.9, wherein the proportionality factor k is no greater than 3, for example, no greater than 2.25 and especially no greater than 2.1, wherein, for the correction term $K_m$ for the mass flow, the following holds:

$K_m := 1 + E_m$, wherein the corrected mass flow $\dot{m}_{corr}$ is ascertained as $$\dot{m}_{corr} := \frac{\dot{m}_v}{K_m},$$

wherein $\dot{m}_v$ the preliminary mass flow value.

10. The method as claimed in claim 1, wherein:
the method additionally includes steps as follows:
determining a deviation between the first preliminary density value based on the eigenfrequency of the f1-mode and the second preliminary density value based on the eigenfrequency of the f3-mode;
testing whether the deviation is greater than a reference value; and,
when this is the case, ascertaining and, in given cases, outputting a value for the velocity of sound.

11. The method as claimed in claim 10, wherein:
the reference value for the deviation of the density values is so selected that the velocity of sound can be determined with a statistical error of no greater than 10%, especially no greater than 5% and preferably no greater than 2%.

12. The method as claimed in claim 10, wherein:
the reference value is not less than 0.2 kg/m³, especially not less than 0.4 kg/m³, and
the reference value is also no greater than 2 kg/m³, for example, no greater than 1 kg/m³, and especially no greater than 0.6 kg/m³.

13. The method as claimed in claim 1, wherein:
the gas-containing liquid oscillating in the measuring tube has a resonant frequency, which is no greater than 20 times the eigenfrequency of the f1-mode of the measuring tube.

14. The method as claimed in claim 1, wherein:
the suspended bubbles have a radius r, which is no greater than five times, especially no greater than three times, a penetration depth δ, wherein $\delta = (\nu/(\pi \cdot f_1))^{1/2}$; and wherein ν is the kinematic viscosity of the liquid.

* * * * *